United States Patent [19]

Miale et al.

[11] 4,427,790

[45] Jan. 24, 1984

[54] ACTIVATION OF ZEOLITES

[75] Inventors: Joseph N. Miale, Lawrenceville; Clarence D. Chang, Princeton, both of N.J.

[73] Assignee: Mobil Oil Corporation, New York, N.Y.

[21] Appl. No.: 355,417

[22] Filed: Mar. 8, 1982

[51] Int. Cl.$^3$ .................... B01J 29/28; B01J 37/26
[52] U.S. Cl. ........................ 502/71; 502/73; 502/74; 502/77
[58] Field of Search .................. 252/433, 442, 455 Z; 423/328

[56] References Cited

U.S. PATENT DOCUMENTS

| | | | |
|---|---|---|---|
| 4,207,250 | 6/1980 | Butter et al. | 252/455 Z |
| 4,305,808 | 12/1981 | Bowes et al. | 252/455 Z |
| 4,324,698 | 4/1982 | Lewis et al. | 252/455 Z |
| 4,331,641 | 5/1982 | Hinnenkamp et al. | 252/455 Z |

*Primary Examiner*—Carl F. Dees
*Attorney, Agent, or Firm*—Alexander J. McKillop; Michael G. Gilman; Dennis P. Santini

[57] ABSTRACT

A method for enhancing the activity of a zeolite, including a zeolite having a silica-to-alumina ratio greater than 100, is disclosed which involves reacting the zeolite with a compound having a complex fluoroanion.

16 Claims, No Drawings

ACTIVATION OF ZEOLITES

CROSS-REFERENCE TO RELATED CASES

This application is related by subject to the copending applications identified as follows:

| Ser. No. | Filing Date | Ser. No. | Filing Date |
|---|---|---|---|
| 319,175 | November 9, 1981 | 333,370 | December 22, 1981 |
| 355,419 | Herewith | 355,418 | Herewith |
| 355,416 | Herewith | 355,415 | Herewith |
| 355,414 | Herewith | 355,413 | Herewith |
| 355,446 | Herewith | 355,420 | Herewith |

BACKGROUND OF THE INVENTION

1. Field of the Invention

This invention relates to a method for enhancing the activity of crystalline zeolites, including high silica-containing crystalline materials, which involves reacting said zeolites with a compound having a complex fluoroanion. The reaction product zeolites may, if desired, be further treated by hydrolysis and/or contact with an ammonium salt solution and calcination.

2. Description of Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as $Ca/2$, $Sr/2$, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by convenient symbols, as illustrated by zeolite ZSM-5 (U.S. Pat. No. 3,702,886).

High silica-containing zeolites are well known in the art and it is generally accepted that the ion exchange capacity of the crystalline zeolite is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5, ZSM-11 (U.S. Pat. No. 3,709,979), and ZSM-12 (U.S. Pat. No. 3,832,449) to mention a few.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an x-ray diffraction pattern characteristic of ZSM-5 type aluminosilicate. U.S. Pat. Nos. 4,061,724; 4,073,865 and 4,104,294 describe microporous crystalline silicas or organo silicates wherein the aluminum content present is at impurity levels.

Because of the extremely low aluminum content of these high silica-containing zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

The novel process of this invention permits the preparation of certain high silica-containing materials which have all the desirable properties inherently possessed by such high silica materials and, yet, have an acid activity which heretofore has only been possible to be achieved by materials having a higher aluminum content in their "as synthesized" form. It further permits valuable activation of crystalline zeolites having much lower silica-to-alumina mole ratios.

It is noted that U.S. Pat. Nos. 3,354,078 and 3,644,220 relate to treating crystalline aluminosilicates with volatile metal halides. Neither of these latter patents is, however, concerned with treatment of crystalline materials having a high silica-to-alumina mole ratio or with treatment of any crystalline zeolite with compounds having a complex fluoroanion.

SUMMARY OF THE INVENTION

The present invention relates to a novel process for improving activity of crystalline zeolites, including high silica-containing crystalline zeolites, which comprises reacting the zeolite either "as synthesized" or initially ion-exchanged, with a compound having a complex fluoroanion. The resulting reaction product zeolite may, if desired, then be contacted with water for hydrolysis, and/or with an ammonium salt solution. The final product zeolite may, if desired, be calcined. The resulting zeolite material exhibits enhanced activity toward catalysis of numerous chemical reactions, such as, for example cracking of organic, e.g. hydrocarbon, compounds.

DESCRIPTION OF SPECIFIC EMBODIMENTS

The novel process of this invention is concerned with the treatment of zeolite material, including high silica-containing crystalline material. The expression "high silica-containing crystalline material" is intended to define a crystalline structure which has a silica-to-alumina ratio greater than 100 and more preferably greater than 500, up to and including those highly siliceous materials where the silica-to-alumina ratio is infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are usually present due to the impurity of the reaction solutions. It is to be understood that the expression "high silica-containing crystalline material" also specifically includes those materials which have other metals besides silica and/or alumina associated therewith, such as boron, iron, chromium, etc.

The zeolite starting materials utilized herein, including those having a silica-to-alumina mole ratio greater than about 100, may be prepared from reaction mixtures containing sources of various cations. The present process provides noted improvement regardless of which cation sources are present in said reaction mixtures. Non-limiting examples of cation sources to be used in the manufacture of the zeolite starting materials include amines, diamines, pyrrolidine, onium compounds and compounds containing multiple cationic centers. Examples of onium compounds are those having the following formula:

$$R_4M^+X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a quadricoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

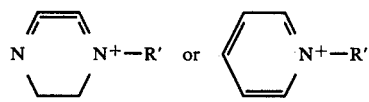

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

The compounds containing multiple cationic centers include those having the formula:

$$[(R)_3M^+(Z)_nM^+(R)_3](X^-)_2$$

wherein R, M and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Non-limiting examples of such multiple cationic center containing compounds include:

[(CH$_3$)$_3$As$^+$(CH$_2$)$_6$N$^+$(CH$_3$)$_3$](Cl$^-$)$_2$,

[(C$_3$H$_7$)$_3$N$^+$(CH$_2$)$_{10}$N$^+$(C$_3$H$_7$)$_3$](Cl$^-$)$_2$,

[(C$_6$H$_5$)$_3$N$^+$(C$_2$H$_4$)$_{16}$P$^+$(C$_6$H$_5$)$_3$](OH$^-$)$_2$,

[(C$_{18}$H$_{37}$)$_3$P$^+$(C$_2$H$_2$)$_3$P$^+$(CH$_3$)$_3$](Cl$^-$)$_2$,

[(C$_2$H$_5$)$_3$N$^+$(C$_6$H$_4$)N$^+$(C$_2$H$_5$)$_3$](Br$^-$)$_2$,

[(CH$_3$)$_3$Sb$^+$(CH$_2$)$_{10}$Sb$^+$(CH$_3$)$_3$](Cl$^-$)$_2$,

[(C$_6$H$_5$)$_3$Sb$^+$(CH$_2$)$_4$N$^+$(CH$_3$)$_3$](OH$^-$)$_2$,

[(CH$_3$)$_3$Bi$^+$(CH$_2$)$_{18}$N$^+$(CH$_3$)$_3$](Br$^-$)$_2$,

[(C$_2$H$_3$)$_3$N$^+$(CH$_2$)$_{50}$N$^+$(C$_2$H$_3$)$_3$](OH$^-$)$_2$,

[(C$_6$H$_5$)$_3$P$^+$(C$_2$H$_2$)$_6$As$^+$(CH$_3$)$_3$](Cl$^-$)$_2$,

[(CH$_3$)$_3$N$^+$(CH$_2$)$_6$N$^+$(CH$_3$)$_3$](Cl$^-$)$_2$, and

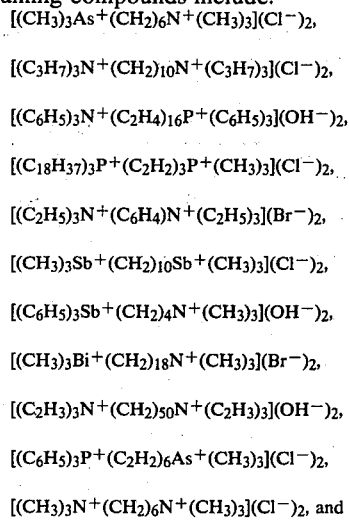

The novel process of this invention is simple and easy to carry out although the results therefrom are dramatic. The process involves reacting a porous crystalline zeolite or highly siliceous porous crystalline material with a compound having the formula:

$$L_{(n-m)}[MF_n]_e$$

wherein L is an organic or inorganic ionic moiety such as, for example, (CH$_3$)$_4$N$^+$, Pt pyr$_2$(NH$_4$)$_2^{-2}$, NH$_4^+$ or Pt(NH$_4$)$_4^{-2}$; [MF$_n$] is a fluoroanion moiety comprising the element M; M is an element selected from the group consisting of elements from Groups VB, VIB, VIIB, VIII, IIIA, IVA and VA of the Periodic Table of the Elements (Sargent-Welch Scientific Company) and Rare Earth elements, such as, for example, boron, aluminum, gallium, silicon, phosphorous, antimony, bismuth, palladium, platinum, iridium, iron, rhenium, molybdenum and tantalum; n is the coordination number of M; m is the valence of M and e is the valence or charge associated with L. Non-limiting examples of the fluoroanion moiety include BF$_4^-$, AlF$_4^-$, PF$_6^-$, BiF$_4^-$, AlF$_5^{-2}$, SiF$_6^{-2}$, SbF$_5^{-2}$, FeF$_4^{-2}$, PtF$_6^{-2}$, AlF$_6^{-3}$, TaF$_8^{-3}$ and PdF$_7^{-3}$.

Non-limiting examples of the compounds having a complex fluoroanion of the above formula L$_{(n-m)}$[MF$_n$]$_e$ include: ammonium tetrafluoroaluminate, ammonium hexafluorophosphate, ammonium tetrafluorobismuthate, ammonium pentafluoroaluminates, ammonium hexafluorosilicate, ammonium pentafluoroantimonate, ammonium tetrafluoroferrite, ammonium hexafluoroplatinate, ammonium hexafluoroaluminate, ammonium octafluorotantalate, ammonium heptafluoropallidate, tetramethylammonium tetrafluoroborate, and ammonium tetrafluoroborate.

The reaction step of the present method may be conducted in a solvent medium, i.e., solution, or as a solid-solid contact reaction and should be conducted at a temperature of from about −70° C. to about 80° C. and a pressure of from about −0.8 psig to about 50 psig.

The reaction product zeolite material of the present method may, if desired, be hydrolyzed by contact with water at a temperature of from about 20° C. to about 550° C. and/or contacted with an ammonium salt solution and calcined. If hydrolyzed and the hydrolyzing temperature is below 100° C. at atmospheric pressure, liquid water may be used. When the boiling point of water is exceeded, such as when the hydrolyzing temperature exceeds 100° C. at atmospheric pressure, the zeolite may be purged with water saturated gas, e.g. helium.

The ammonium salt solution contacting step may be conducted, if desired, with an aqueous or non-aqueous solution of an ammonium salt, e.g. $NH_4NO_3$, for a period of time of from about 1 hour to about 20 hours at a temperature of from ambient to about 100° C. The ammonium salt used is not narrowly critical and will normally be an inorganic salt such as ammonium nitrate, ammonium sulfate, ammonium chloride, etc. The hydrolysis and ammonium salt solution contacting steps, if conducted, may be conducted simultaneously when the ammonium salt solution is aqueous.

The zeolite treated in accordance with the present method may, thereafter, be calcined at a temperature of from about 200° C. to about 600° C. in an inert atmosphere of air, nitrogen, etc. for from about 1 minute to about 48 hours.

Of the zeolite materials advantageously treated in accordance herewith, zeolites ZSM-5, ZSM-11, ZSM-12, ZSM-23, ZSM-35, ZSM-38 and ZSM-48 are particularly noted. ZSM-5 is described in U.S. Pat. Nos. 3,702,886 and Re 29,948, the entire contents of each being hereby incorporated by reference herein. ZSM-11 is described in U.S. Pat. No. 3,709,979, the teaching of which is incorporated herein by reference. ZSM-12 is described in U.S. Pat. No. 3,832,449, the contents of which are incorporated herein by reference. ZSM-23 is described in U.S. Pat. No. 4,076,842, the teaching of which is incorporated herein by reference. The contents of U.S. Pat. Nos. 4,016,245 and 4,046,859, describing ZSM-35 and ZSM-38, respectively, are incorporated herein by reference.

ZSM-48 can be identified, in terms of moles of anhydrous oxides per 100 moles of silica as follows:

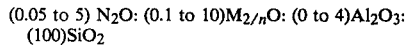
(0.05 to 5) $N_2O$: (0.1 to 10)$M_{2/n}O$: (0 to 4)$Al_2O_3$: (100)$SiO_2$ wherein M is at least one cation having a valence n, N is a mixture of a $C_2$–$C_{12}$, and more preferably of a $C_3$–$C_5$ alkylamine and a tetramethyl ammonium compound and wherein the composition is characterized by the distinctive X-ray diffraction pattern as shown below:

| Characteristics Lines of Zeolite ZSM-48 | |
|---|---|
| d (A) | Relative Intensity (I/Io) |
| 11.8 ± 0.2 | S |
| 10.2 ± 0.2 | W-M |
| 7.2 ± 0.15 | W |
| 4.2 ± 0.08 | VS |
| 3.9 ± 0.08 | VS |
| 3.6 ± 0.06 | W |

| -continued | |
|---|---|
| Characteristics Lines of Zeolite ZSM-48 | |
| d (A) | Relative Intensity (I/Io) |
| 3.1 ± 0.05 | W |
| 2.85 ± 0.05 | W |

These values were determined by standard techniques. The radiation was the K-alpha doublet of copper, and a diffractometer equipped with a scintillation counter and a strip chart pen recorder was used. The peak heights, I, and the positions as a function of two times theta, where theta is the Bragg angle, were read from the spectrometer chart. From these, the relative intensities, 100 $I/I_o$, where $I_o$ is the intensity of the strongest line or peak, and d (obs.), the interplanar spacing in Angstroms (A) corresponding to the recorded lines, were calculated. In the foregoing table the relative intensities are given in terms of the symbols W=weak, VS=very strong, M=medium and W-M=weak-to-medium (depending on the cationic form). Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

ZSM-48 can be prepared from a reaction mixture containing a source of silica, tetramethylammonium compound, $C_2$–$C_{12}$ alkylamine, an alkali metal oxide, e.g. sodium, with or without a source of alumina, and water, and having a composition, in terms of mole ratios of oxides, falling within the following ranges:

| REACTANTS | BROAD | PREFERRED |
|---|---|---|
| $Al_2O_3/SiO_2$ | 0 to 0.08 | 0 to 0.02 |
| $Na_2O/SiO_2$ | 0.01 to 1.0 | 0.1 to 0.5 |
| $N_2O/SiO_2$ | 0.005 to 0.5 | 0.005 to 0.25 |
| $OH^-/SiO_2$ | 0.01 to 0.5 | 0.05 to 0.2 |
| $H_2O/SiO_2$ | 10 to 200 | 20 to 100 | wherein N is a mixture of a $C_2$–$C_{12}$ alkylamine and tetramethyl ammonium compound, and maintaining the mixture at 80°–200° C. until crystals of ZSM-48 are formed.

The molar ratio of $C_2$–$C_{12}$ alkylamine to tetramethylammonium compound is not narrowly critical and can range from 1:1 to 10:1. The tetramethylammonium compound can include the hydroxide or halide with the chloride being particularly preferred.

The original cations of ZSM-48 can be replaced, at least in part, by calcination and/or ion exchange with another cation. Thus, the original cations are exchanged into a hydrogen or hydrogen ion precursor form or a form in which the original cation has been replaced by a metal of Groups II through VIII of the Periodic Table. Thus, for example, it is contemplated that the original cations can be replaced with ammonium ions or with hydronium ions. Catalytically active forms of these would include, in particular, hydrogen, rare earth metals, aluminum, metals of Groups II and VIII of the Periodic Table and manganese.

The activity enhanced crystalline zeolite materials prepared by the present process are useful as catalyst components for acid catalyzed organic compound conversion reactions. Such reactions include, as non-limiting examples, cracking of hydrocarbons, wherein the reaction conditions include a temperature of from about 300° C. to about 800° C., a pressure of from about 15 psia to about 500 psia, and a weight hourly space velocity of from about 0.1 to about 20; and conversion of methanol to gasoline wherein the reaction conditions include a temperature of from about 300° C. to about 550° C., a pressure of from about 5 psia to about 500 psia, and a weight hourly space velocity of from about 0.1 to about 100.

In practicing a particularly desired chemical conversion process, it may be useful to incorporate the above-described activity enhanced crystalline zeolite with matrix comprising material resistant to the temperature and other conditions employed in the process. Such matrix material is useful as a binder and imparts additional resistance to the catalyst for the severe temperature, pressure and reactant feed stream velocity conditions encountered in many cracking processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing matrix materials, the catalyst employed herein may be composited with a porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of activity enhanced zeolite component and matrix, on an anhydrous basis, may vary widely with the zeolite content of the dry composite ranging from about 1 to about 99 percent by weight and more usually in the range of about 5 to about 80 percent by weight.

The following examples will illustrate the novel method of the present invention.

EXAMPLE 1

Zeolite ZSM-5 having a silica-to-alumina mole ratio of about 26,000:1 (65 ppm framework alumina, 110 ppm bulk alumina and 0.23 percent sodium) was prepared from a reaction mixture containing tetraalkylammonium ions. The ZSM-5 was converted to $NH_4$-ZSM-5 by treating with 1.0 N $NH_4NO_3$ at ambient temperature. A 2 gram sample of extrudate comprising 65 parts of the $NH_4$-ZSM-5 and 35 parts of Kaiser gamma-alumina monohydrate was prepared by slurrying and extruding the components. The extrudate was then impregnated under vacuum (20 mm psia, −0.85 psig) and at a temperature of 25° C. with a saturated aqueous solution of ammonium tetrafluoroborate ($NH_4BF_4$). After 30 minutes contact, the extrudate was dried at 130° C. and treated twice with cold $NH_4NO_3$. It was then dried again, calcined at 538° C., refluxed for one hour with $NH_4NO_3$ and then washed with boiling water. The calcination and refluxing was repeated once more.

EXAMPLE 2

The 2 gram sample of extrudate reacted with a compound having a complex fluoroanion, i.e. ammonium tetrafluoroborate, prepared in Example 1 was subjected to the Alpha Test to measure catalytic activity. A sample of extrudate prepared as in Example 1, except that it was not contacted with the complex fluoroanion containing compound, was also tested for comparison purposes. The Constraint Index of the final product of Example 1 was also measured. The results of these tests are listed below:

|  | Alpha Value | Constraint Index |
| --- | --- | --- |
| Starting material | 1 | — |
| Example 1 product | 102 | 2.2 |

As is known in the art, the Alpha value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1. The Alpha test is described in U.S. Pat. No. 3,354,078 and in the Journal of Catalysis, Vol. IV, pp. 522–529 (August 1965). The Constraint Index is a measure of the selectivity of the particular catalyst and it involves conversion of normal hexane and 3-methylpentane. This test is described in many U.S. patents, including U.S. Pat. Nos. 4,231,899 and 4,288,647, and in the Journal of Catalysis, Volume 67, pp. 218–222 (1981).

What is claimed is:

1. A method for enhancing the activity of a porous crystalline zeolite having a silica-to-alumina mole ratio greater than about 100 which comprises reacting said zeolite with a compound having the formula:

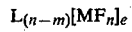

wherein L is an organic or inorganic ionic moiety, $[MF_n]$ is a fluoraonion moiety comprising the element M, M is an element selected from the group consisting of elements from Groups VB, VIB, VIIB, VIII, IIIA, IVA and VA of the Periodic Table of the Elements and Rare Earth elements, n is the coordination number of M, m is the valence of M and e is the charge associated with L, said reaction being conducted at a temperature of from about −70° C. to about 80° C. and a pressure of from about −0.8 psig to about 50 psig.

2. The method of claim 1 wherein said zeolite has a silica-to-alumina mole ratio greater than about 500.

3. The method of claim 1 which comprises the additional step of hydrolyzing said zeolite reacted with said compound.

4. The method of claim 3 which comprises the additional step of contacting said hydrolyzed zeolite with an ammonium salt solution.

5. The method of claim 4 which comprises the additional step of calcining said ammonium salt solution contacted zeolite at a temperature of from about 200° C. to about 600° C.

6. The method of claim 4 wherein said ammonium salt solution is ammonium nitrate.

7. The method of claim 1 wherein said zeolite is ZSM-5, ZSM-11, ZSM-12, ZSM-23, ZSM-35, ZSM-38 or ZSM-48.

8. The method of claim 3 wherein said zeolite is ZSM-5 or ZSM-11.

9. A zeolite composition having enhanced activity prepared by the method of claim 1, 2, 3, 4, 5, 6, 7 or 8.

10. A method for enhancing the activity of a porous crystalline zeolite having a silica-to-alumina mole ratio greater than about 100 which comprises compositing said zeolite with matrix material comprising alumina, and reacting said composite with a compound having the formula:

$$L_{(n-m)}[MF_n]_e$$

wherein L is an organic or inorganic ionic moiety, $[MF_n]$ is a fluoroanion moiety comprising the element M, M is an element selected from the group consisting of elements from Groups VB, VIB, VIIB, VIII, IIIA, IVA and VA of the Periodic Table of the Elements and Rare Earth elements, n is the coordination number of M, m is the valence of M and e is the charge associated with L, said reaction being conducted at a temperature of from about $-70°$ C. to about 80° C. and a pressure of from about $-0.8$ psig to about 50 psig.

11. The method of claim 10 wherein said zeolite has a silica-to-alumina mole ratio greater than about 500.

12. The method of claim 10 which comprises the additional step of contacting said composite with an ammonium salt solution.

13. The method of claim 12 which comprises the additional step of calcining said ammonium salt solution contacted composite at a temperature of from about 200° C. to about 600° C.

14. The method of claim 10 wherein said zeolite has the structure of ZSM-5, ZSM-11, ZSM-12, ZSM-23, ZSM-35, ZSM-38 or ZSM-48.

15. The method of claim 10 wherein said composite is an extrudate.

16. A zeolite composition prepared by the method of claim 10.

* * * * *